Figure 1:
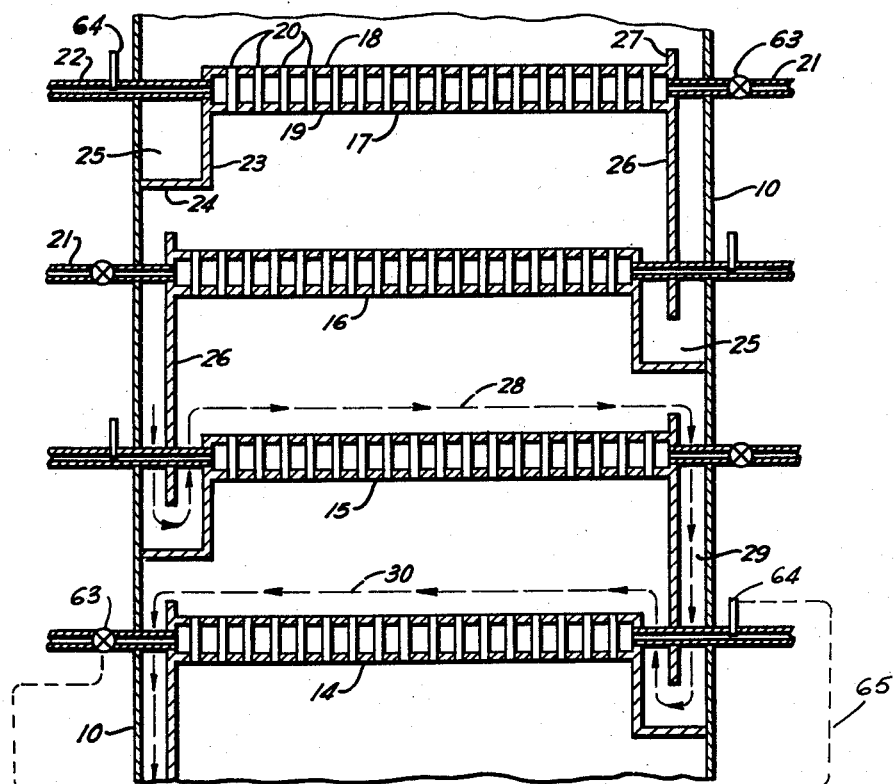

Nov. 10, 1959  W. R. LEHRIAN  2,912,377
VACUUM DISTILLATION APPARATUS AND PROCESS
Filed July 13, 1956  2 Sheets-Sheet 1

INVENTOR.
WILLIAM R. LEHRIAN
BY
HIS ATTORNEY

United States Patent Office 2,912,377
Patented Nov. 10, 1959

2,912,377

VACUUM DISTILLATION APPARATUS AND PROCESS

William R. Lehrian, Verona, Pa., assignor to Gulf Research & Development Company, Pittsburgh, Pa., a corporation of Delaware Application July 13, 1956, Serial No. 597,640

10 Claims. (Cl. 208—353)

This invention relates to a rectification apparatus and process. More particularly it relates to a fractionating tower containing a multiplicity of perforate fractionating plates, each plate being hollow and provided with means for the introduction and removal of a heat-transfer fluid.

The invention further comprises a method of fractionating vapors in which the fractionating column is operated under vacuum and in which the material undergoing fractionation is subjected to conventional contact rectification and thermal rectification simultaneously.

Conventional contact rectification is quite effective at atmospheric pressure and above, but even in that pressure range it nevertheless falls far short of perfect separation and any considerable improvement is highly desirable. When operating under relatively high vacuum, for instance at absolute pressures of less than approximately one hundred millimeters of mercury, contact rectification is much less effective due to the tenuity of the vapor phase. At these pressures the density of the vapors is extremely low and their velocity through the fractionating tower is exceedingly high as compared to that at atmospheric pressure, and equilibration between liquid and vapor at the interface becomes of minor importance. Under these circumstances thermal rectification is highly effective and becomes increasingly effective with increasing reduction of pressure. This invention is a primary advance in the rectification art, particularly in that it provides a system that will effect closer fractionation than has heretofore been attainable. This is especially true in the distillation of complex mixtures such as petroleum. When operating my process at absolute pressures lower than one hundred millimeters of mercury, ordinarily at least one half of the fractionation of the vapors is believed to be by thermal rectification, effected by my use of a subsequently-described series of plates the temperatures of which are positively controlled independent of the vapors undergoing fractionation.

One important use of my process is in distilling a crude oil or topped crude to obtain an overhead stock for use in catalytic cracking. Cracking catalysts are highly susceptible to poisoning by organo-metallic compounds present in some of the crudes currently used, and the metallic compounds are present in increasing concentration as we cut deeper and deeper into the crude. While the higher boiling distillates are the most desirable cracking-still stock, it is necessary to reject substantial portions of this material because of metal content. Any process that improves the rectification of these stocks is of much importance and utility in the refining of petroleum because closer rectification permits the refiner to take a higher percentage of distillate overhead for catalytic cracking still charge while not contaminating it with fractions containing prohibitive amounts of organometallic compounds.

This invention is likewise of great utility in the manufacture of lubricating oils. High quality lubricants are manufactured by distilling them overhead while leaving asphaltic and other objectionable components of the crude in a heavy residue which is then consigned to fuel or other lower-value use. My invention, by effecting a closer separation of components, permits me to obtain a higher yield of high-value lubricating stock from the crude. In both of the cases mentioned, running for catalytic cracking still charge and running for lubricating distillate, the increased yield of valuable distillate is obtained because it is no longer necessary to leave a substantial amount of the desired material with the residue as has been necessary with the poorer fractionation of past practice in order to avoid getting higher boiling asphaltic or metallic components into the distillate. In an operation of this character the rectification is as important in maintaining close separation of the heavy cut and of any side streams as it is in producing a desired overhead cut.

Figure 2:
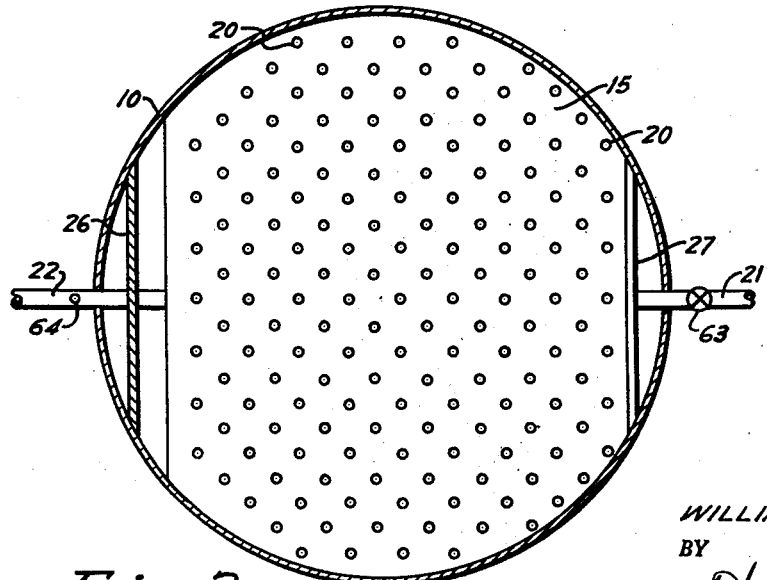
Figure 3:
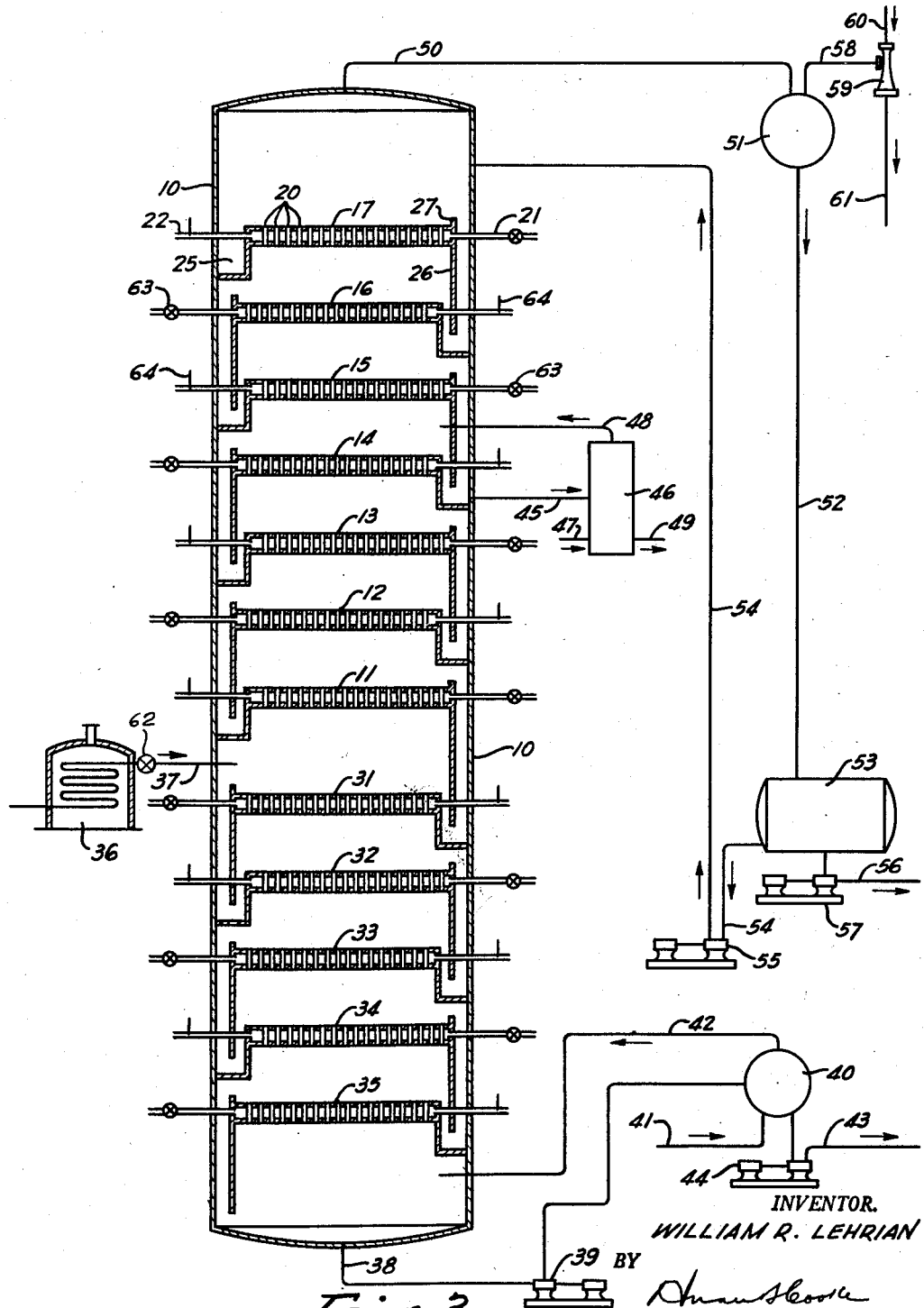

The apparatus of my invention is shown in the accompanying drawings, wherein Figure 1 is a vertical sectional view of a fractionating tower and of individual fractionating plates; Figure 2 is a plan view of one of the fractionating plates 15 shown in Figure 1; and Figure 3 is a vertical sectional view of a fractionating tower equipped with plates adapted to the conduct of my process. Figure 3 also shows, in schematic arrangement, related pieces of equipment, external to the fractionating tower and used therewith in the practice of my process.

Referring to Figures 1 and 2, numeral 10 indicates the shell of a vertical cylindric fractionating column. Numerals 14, 15, 16 and 17 indicate successive trays, proceeding from lowermost to uppermost. The individual plates are made hollow, with an upper deck 18, lower wall 19 and a series of tubular passageways 20 extending therebetween. The hollow plate is provided with pipe connections 21 and 22 at opposite ends of the plate to permit the introduction and removal of temperature controlling fluid to and from the interior of the plate. A valve 63 is positioned on either pipe connection 21 or 22 to control the flow of temperature controlling fluid through the tray, and a well 64 is positioned on the fluid outlet line to receive a thermometer or other temperature-sensing device. Advantageously the temperature-sensing device will automatically control the opening and closing of valve 63, and a communicating conduit 65 extends from temperature-sensing device 64 to valve 63 to effect such automatic control. The effectuating medium may be hydraulic, as shown, pneumatic, electric, or equivalent means. For simplification of the drawing, the communicating means 65 is indicated only in connection with plate 14 in Figure 1, but this automatic control, when used, would normally be installed for automatic communication between the temperature-sensing device 64 and the valve 63 on lines 22 and 21 of each plate. The two may be combined in one device, temperature actuated valves being common articles of commerce.

Extending downward from one end of each plate is a vertical wall 23 which, together with horizontal wall 24 and vertical wall 10 of the tower shell, form a sump 25 to receive downflowing liquid from higher portions of the tower. At the other end of the plate is a downwardly extending vertical apron or wall 26 which carries a lip or weir 27 at the top, and which is perforated at one point to permit the passage therethrough of conduit 22 as it extends inwardly through tower wall 10 to the interior of the next lower plate. Liquid flowing across plate 17 is retained to a certain depth by lip or weir 27 and then flows downward through the passageway formed by wall 26 and shell 10. Wall 26 extends downward beyond the deck of the next lower plate, and into the sump 25 of that plate, thereby forming a trap. While the foregoing description is with particular respect to plates 17 and 16, all plates in the tower have corresponding parts and interrelations. Dotted lines 28, 29, and 30, with their directional arrows, indicate the course of downwardly flowing liquid in the tower.

Numerals used to identify elements on Figures 1 and 2 identify the same elements when appearing on Figure 3.

Referring further to Figure 3, numerals 11, 12, and 13 indicate trays in the fractionating section of column 10 similar to previously identified trays 14, 15, 16, and 17. A heater for heating the material operated on is indicated by 36 and the heated stream therefrom is discharged through conduit 37 into an intermediate section of column 10, immediately below the lowest fractionating plate. Below the point at which conduit 37 enters column 10 are a series of stripping plates 31, 32, 33, 34, and 35. Liquid residue from the lowermost stripping plate leaves tower 10 through conduit 38, and passes, advantageously with the aid of pump 39 into reboiler 40. Line 41 is provided to conduct heating fluid such as steam into reboiler 40. This will be for introduction of open steam into the reboiler or its use in a closed coil, according to the needs of the process being conducted. Vapors from reboiler 40 are returned to column 10 at a point below the bottom stripping plate through conduit 42 and unvaporized residue from reboiler 40 finally leaves the system through conduit 43 with the aid of pump 44.

The column shown in Figure 3 is fitted to deliver a side stream through conduit 45. This stream goes to stripper 46. Steam, either open or in a closed coil, according to the needs of the operation, is introduced into the stripper through conduit 47. Vapors from the stripper are returned to the tower through conduit 48 and the stripped side-stream finally leaves the system through conduit 49 with the aid of a pump, not shown.

Vapors passing beyond the top fractionating plate, 17, of tower 10 leave the tower through conduit 50 and pass to condenser 51. Condensate from condenser 51 flows through conduit 52 into accumulator 53 and a portion of this condensate is returned to the top plate 17 of tower 10 through conduit 54 in which is interposed a pump 55. The remaining condensate from accumulator 53 is discharged from the system through conduit 56 with the aid of pump 57.

A conduit 58 leads from condenser 51 to the suction side of an ejector 59, the ejector being energized by steam from conduit 60 and discharging from the system through conduit 61. Any equivalent or additional means may be used to maintain the desired low pressure in the system.

As shown in Figure 3, oil is passed through a heater 36 and discharged past pressure maintaining valve 62 into fractionating column 10. Column 10 is maintained under a high vacuum, advantageously at a pressure of the order of 50 to 100 mm. absolute, and the oil introduced thereinto from heater 36 is spontaneously flashed, to a large extent, into vapor. These vapors being under subatmospheric pressure, the volume of vapor is extremely great and, to insure the least pressure drop through the rectifying tower it is of utmost importance that the plates in the rectifying column shall be of a design having minimum individual resistance, and which will effectuate the desired rectification with a minimum number of plates. My plate as shown at 17 in Figures 1 and 2, meets the specified requirements to a high degree. The construction of this plate has been previously described in detail. One primary feature of this plate is the uncapped tubular passageways 20 through the plate for the unrestricted upward passage of vapors. I find on large scale columns using plates of this design that the pressure drop per plate is from ½ to 7 millimeters of mercury, with the drop ordinarily between 2 and 5 millimeters per plate. In proper operation of a column fitted with these plates there is no downward dribbling of liquid through the tubular passageways 20, prevention of downward flow of liquid being prevented by sufficient upward flow of vapor. Rectifying columns fitted with plates of my design are useful at atmospheric and superatmospheric pressure as well as at subatmospheric pressure. Also such columns are advantageous for conventional operation with normal temperature gradient, i.e. without heating and cooling of alternate plates. They are also advantageous with controlled cooling or controlled heating of all plates or of some plates.

The process of my invention involves, in large degree, the use of thermal rectification as distinguished from contact rectification. Contact rectification is the process ordinarily carried on in rectifying columns fitted with bubble plates, cascade trays, packed columns, perforated plates, etc. and is characterized by intimate contact of rising vapor and descending liquid. A two-way transfer of material between the liquid and vapor occurs spontaneously as the vapor and liquid in contact seek equilibrium. Contact rectification is highly effective at atmospheric pressure, at superatmospheric pressure, and at pressures moderately below atmospheric.

Thermal rectification is accomplished by repeated partial vaporization of liquid or partial condensation of vapor or by a combination of these two. The extent of the composition change in each step depends upon the amount of heat added to the liquid or removed from the vapor. The amount of heat added or removed at a certain plate may be more or less than that removed or added at the next succeeding plate, but over the length of a rectifying tower there will be an approximate balance of heat removed and heat added.

In the practice of my process, in one specific example, the vapors in the zone between the top stripping plate and the bottom rectifying plate had a temperature of 750° F. The vapors, in conventional operation, without either heating or cooling of any of the plates, had temperatures of 740°, 730°, 720°, 710° and 700° F. in successive inter-plate zones of the rectifying column. Subsequently operating the column in accordance with my invention, the temperature in the zone between the bottom rectifying plate and the next higher rectifying plate and in each second such zone above the first was lowered two degrees, while the temperatures of the other zones were raised two degrees. That gave a temperature sequence in the successive zones of 748°, 742°, 728°, 722°, 708° and 702° F., and it will be observed that the temperature differences between successive plates in that instance were 6°, 14°, 6°, 14°, and 6° F. In this operation, both with and without temperature control of the individual plates, the absolute pressure immediately below the bottom rectifying plate was 70 mm. of mercury, and the absolute pressure above the top plate was 55 mm.

In a second specific example, while the original temperatures in successive zones from bottom to top with conventional operation were 740°, 730°, 720°, 710° and 700° F., the operation was then changed to conform to my invention, and the successive zones had temperatures of 747°, 743°, 727°, 723°, 707°, and 703° F. In that case the temperature differences between successive zones were 4°, 16°, 4°, 16°, and 4° F. In this operation, both with and without temperature control of the individual plates, the absolute pressure immediately below the bottom rectifying plate was 70 mm. of mercury, and the pressure above the top plate was 55 mm. In each of the two above-described operations, when operating according to my invention I attained a much closer rectification of the vapors than by conventional operation and was able to obtain an overhead distillate of 68 percent containing only 0.5 part per million of vanadium as organo-metallic compounds in contrast to only 64 percent distillate containing 1.0 part per million of vanadium as organo-metallic compounds when operating the tower in conventional manner under the same pressure.

In the practice of my process the temperature of the heating or cooling medium passed through a hollow plate such as 17 will, in the case of a liquid medium, ordinarily be within a range of 10° F. to 50° F. above or below that of the vapors passing through the plate, the actual temperature difference depending upon the nature of the fluid used, the rate of distillation, the heat transfer characteristics of the plates in specific installations and of the material being rectified, and the extent to which it is desired to cool or superheat the vapor. Petroleum oil serves very well as a heat transfer medium when the temperatures are moderate, but other materials such as Dowtherm are preferred at higher temperatures.

In the practice of my process I ordinarily find it advantageous to add enough heat in each heating zone to vaporize in that zone somewhere between approximately five percent and approximately thirty percent of the reflux liquid entering that zone, and to remove enough heat in each cooling zone to condense in such zone somewhere between approximately five percent and approximately thirty percent of the vapors entering such zone.

I claim:

1. A method of rectification at sub-atmospheric pressures of the vapors of petroleum and of petroleum fractions which comprises: passing liquid reflux downwardly through a plurality of not less than four superimposed zones in a rectifying column and causing it to flow horizontally across each such zone; passing the vapors to be rectified upwardly through the said plurality of superimposed zones, and through the downflowing reflux during the horizontal passage of the said reflux across each zone; controllably adding heat to each of a first series of the said zones and controllably extracting heat from each of a second series of the said zones, while having the individual zones of one series follow the individual zones of the other series in alternate succession; and finally condensing the rectified vapors and returning a portion of such condensate to a high point in the rectifying column to serve as the reflux liquid.

2. A method of rectification at sub-atmospheric pressures of the vapors of petroleum and of petroleum fractions which comprises: passing liquid reflux downwardly through a plurality of not less than four superimposed zones in a rectifying column and causing it to flow horizontally across each such zone; passing the vapors to be rectified upwardly through the said plurality of superimposed zones, and through the downflowing reflux during the horizontal passage of the said reflux across each zone; adding heat to each of a first series of the said zones in an individually controlled manner, and extracting heat from each of a second series of the said zones in an individually controlled manner, while having the individual zones of one series follow the individual zones of the other series in alternate succession; and finally condensing the rectified vapors and returning a portion of such condensate to a high point in the rectifying column to serve as the reflux liquid.

3. A system of thermal rectification at sub-atmospheric pressures of the vapors of petroleum and of petroleum fractions which comprises: passing liquid reflux downwardly through a plurality of not less than four superimposed zones in a rectifying column and causing it to flow horizontally across each such zone; passing the vapors to be rectified upwardly through the said plurality of superimposed zones and through the downflowing reflux during the horizontal passage of the said reflux across each zone; adding heat to one of the said zones and extracting heat from the next succeeding zone, and similarly adding heat and extracting heat in successive pairs of zones, the quantity of heat added to a particular zone being sufficient to vaporize a substantial portion of the reflux liquid in such zone and the quantity of heat extracted from a particular zone being sufficient to condense a substantial portion of the vapors in such zone; and finally condensing the rectified vapors and returning a portion of such condensate to a high point in the rectifying column to serve as the reflux liquid.

4. A system of thermal rectification at sub-atmospheric pressures of the vapors of petroleum and of petroleum fractions which comprises: passing liquid reflux downwardly through a plurality of not less than four superimposed zones in a rectifying column and causing it to flow horizontally across each such zone; passing the vapors to be rectified upwardly through the said plurality of superimposed zones and through the downflowing reflux during the horizontal passage of the said reflux across each zone; adding heat to one of the said zones and extracting heat from the next succeeding zone, and similarly adding heat and extracting heat in successive pairs of zones, the quantity of heat added to a particular zone being individually controlled and sufficient to vaporize not less than ten percent and not more than thirty percent of the reflux liquid in such zone, and the quantity of heat extracted from a particular zone being individually controlled and sufficient to condense not less than ten percent and not more than thirty percent of the vapors in such zone; and finally condensing the rectified vapors and returning a portion of such condensate to a high point in the rectifying column to serve as the reflux liquid.

5. A system of thermal rectification at sub-atmospheric pressures of the vapors of petroleum and of petroleum fractions which comprises: passing liquid reflux downwardly through a plurality of not less than four superimposed zones in a rectifying column and causing it to flow horizontally across each such zone; passing the vapors to be rectified upwardly through the said plurality of superimposed zones and through the downflowing reflux during the horizontal passage of the said reflux across each zone; controllably adding heat to one of the said zones and controllably extracting heat from the next succeeding zone, and similarly adding heat and extracting heat in successive pairs of zones, the quantity of heat added to a particular heated zone being sufficient to vaporize not less than approximately ten percent nor more than approximately 30 percent of the reflux liquid entering such zone and the quantity of heat extracted from a particular zone being sufficient to condense not less than approximately ten percent nor more than approximately 30 percent of the vapors entering such zones; and finally condensing the rectified vapors and returning a portion of such condensate to a high point in the rectifying column to serve as the reflux liquid.

6. A method of rectifying mixed vapors of petroleum at sub-atmospheric pressures which comprises: causing a stream of such vapor to flow upward through a plurality of not less than four superimposed, separate but seriately communicating, individual zones in a rectifying column, which column is characterized by a relatively hot lower extremity and a relatively cool higher extremity; condensing rectified vapors and returning at least a portion of this condensate to the rectifying column at a high point thereof to serve as reflux liquid; flowing the reflux liquid downwardly through the superimposed zones and causing it, in each individual zone, to flow horizontally across and in open contact with the stream of ascending vapors; subjecting the rectifying column to substantial sub-atmospheric pressure at its relatively cool extremity; adding heat in a controlled manner to one of said individual zones to increase the vaporization therein or lower-boiling components of the reflux liquid and extracting heat in a controlled manner from the next higher individual zone to increase the condensation therein of higher boiling components of the ascending vapors; and similarly adding heat to and extracting heat in an individually controlled manner from succeeding alternate individual zones as the vapors pass through the rectifying column.

7. A method of rectifying mixed vapors of petroleum at sub-atmospheric pressure which comprises: passing the vapors undergoing rectification through a vapor enrichment sequence in which rising vapors in a rectifying column are warmed by radiation from and contact with the underside of a heated rectifying plate and by radiation from and contact with a plurality of elongated passageways through the said rectifying plate during passage of the said vapors therethrough, and by contact with reflux liquid flowing across the said heated rectifying plate and which reflux has been heated thereby; immediately thereafter passing the vapors from the vapor enrichment sequence through a liquid enrichment sequence in which the said vapors are cooled by radiation to and contact with the underside of a cooled rectifying plate and by radiation to and contact with the surrounding walls of a plurality of elongated passageways through the said rectifying plate during passage of the said vapors therethrough, and by contact with reflux liquid flowing across the said cooled rectifying plate and which reflux has been cooled thereby; and immediately thereafter passing the vapors from the liquid enrichment sequence to a further alternate succession of not less than two similar vapor enrichment sequences and of not less than two similar liquid enrichment sequences.

8. A rectifying column of the type fitted with a series of horizontal fractionating plates, each with a plurality of not less than four uncapped passageways through the deck thereof to permit the upward passage of vapors therethrough, and having each plate equipped with a sump at one side adapted to receive downflowing liquid and with a downcomer at the opposite side adapted to deliver downflowing liquid into the sump of the next lower fractionating plate and to form a liquid seal at said sump against the upward flow of vapors through the downcomer, which comprises: a series of not less than four of the said fractionating plates, each individual plate having a hollow interior adapted to receive a temperature-controlling fluid, the vapor passageways being surrounded by the said hollow interior but not in open communication therewith; conduits connecting into the hollow interior of each plate at opposite sides thereof, with an individual flow-control valve on one such conduit for each plate and a temperature-sensing device on one such conduit for each plate; and means for automatically regulating the opening of each such valve by the temperature-sensing device on the outlet conduit from the plate controlled by said valve.

9. A system of thermal rectification of the vapors of petroleum and of petroleum fractions at absolute pressures not substantially exceeding 100 mm. of mercury which comprises: passing liquid reflux downwardly through a plurality of not less than four superimposed zones in a rectifying column and causing it to flow horizontally across each such zone; passing the vapors to be rectified upwardly through the said plurality of superimposed zones and through the downflowing reflux during the horizontal passage of the said reflux across each zone; controllably adding heat to one of the said zones and controllably extracting heat from the next succeeding zone, and similarly adding heat and extracting heat in successive pairs of zones, the quantity of heat added to a particular heated zone being sufficient to vaporize not less than approximately 10 percent of the reflux liquid entering such zone and the quantity of heat extracted from a particular zone being sufficient to condense not less than approximately 10 percent of the vapors entering such zone; and finally condensing the rectified vapors and returning a portion of such condensate to a high point in the rectifying column to serve as the reflux liquid.

10. A system of thermal rectification of the vapors of petroleum and of petroleum fractions at absolute pressures not substantially exceeding 100 mm. of mercury which comprises: passing liquid reflux downwardly through a plurality of not less than four superimposed zones in a rectifying column and causing it to flow horizontally across each such zone; passing the vapors to be rectified upwardly through the said plurality of superimposed zones and through the downflowing reflux during the horizontal passage of the said reflux across each zone; controllably adding heat to one of the said zones and controllably extracting heat from the next succeeding zone, and similarly adding heat and extracting heat in successive pairs of zones, the quantity of heat added to a particular heated zone being sufficient to vaporize not less than approximately 10 percent nor more than approximately thirty percent of the reflux liquid entering such zone and the quantity of heat extracted from a particular zone being sufficient to condense not less than approximately 10 percent nor more than approximately thirty percent of the vapors entering such zone; and finally condensing the rectified vapors and returning a portion of such condensate to a high point in the rectifying column to serve as the reflux liquid; all while maintaining the system under an absolute pressure not substantially exceeding 100 mm. of mercury.

References Cited in the file of this patent

UNITED STATES PATENTS

| | | |
|---|---|---|
| 1,567,458 | Newton | Dec. 29, 1925 |
| 2,006,986 | Florez | July 2, 1935 |
| 2,132,150 | Fenske | Oct. 4, 1938 |
| 2,140,342 | Wallis et al. | Dec. 13, 1938 |
| 2,290,209 | Rosenthal | July 21, 1942 |
| 2,292,350 | Brandt | Aug. 11, 1942 |
| 2,415,411 | Bowman | Feb. 11, 1947 |
| 2,578,670 | Carleton | Dec. 18, 1951 |
| 2,690,060 | Legatski | Sept. 28, 1954 |
| 2,698,282 | Findlay | Dec. 28, 1954 |

FOREIGN PATENTS

| | | |
|---|---|---|
| 2,900 | Great Britain | 1897 |
| 638,092 | Great Britain | May 31, 1950 |

UNITED STATES PATENT OFFICE
CERTIFICATE OF CORRECTION

Patent No. 2,912,377                                                                                November 10, 1959

William R. Lehrian

It is hereby certified that error appears in the printed specification of the above numbered patent requiring correction and that the said Letters Patent should read as corrected below.

Column 6, line 58, for "or lower-boiling" read -- of lower-boiling --.

Signed and sealed this 10th day of May 1960.

(SEAL)
Attest:

KARL H. AXLINE                                                    ROBERT C. WATSON
Attesting Officer                                               Commissioner of Patents